(12) United States Patent
Kikuchi

(10) Patent No.: US 7,520,959 B2
(45) Date of Patent: Apr. 21, 2009

(54) METHOD FOR MANUFACTURING LIGHT BARRIER PACKAGING MATERIAL, LIGHT BARRIER PACKAGING MATERIAL, SEMI PAPER PACKAGING MATERIAL AND LIGHT BARRIER PAPER PACKAGING CONTAINER

(75) Inventor: Hideyo Kikuchi, Gotemba (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 427 days.

(21) Appl. No.: 10/513,921

(22) PCT Filed: May 8, 2003

(86) PCT No.: PCT/JP03/05736

§ 371 (c)(1),
(2), (4) Date: May 20, 2005

(87) PCT Pub. No.: WO03/097350

PCT Pub. Date: Nov. 27, 2003

(65) Prior Publication Data

US 2005/0252627 A1   Nov. 17, 2005

(30) Foreign Application Priority Data

May 16, 2002  (JP) ............... 2002-141169
Nov. 28, 2002 (JP) ............... 2002-345251

(51) Int. Cl.
*D21H 27/30* (2006.01)
*D21H 19/40* (2006.01)
*D21H 19/84* (2006.01)
*B32B 29/06* (2006.01)
*B65D 65/42* (2006.01)

(52) U.S. Cl. .............. 162/126; 162/134; 162/136; 162/137; 162/181.8; 428/211.1; 428/537.5

(58) Field of Classification Search ......... 162/123–128, 162/134–137, 158, 162, 168.1, 169, 181.8, 162/231, 132; 428/34.8, 486, 488.11, 511, 428/513, 535, 537.5, 342, 521, 211.1
See application file for complete search history.

(56) References Cited

U.S. PATENT DOCUMENTS 6,680,103 B1 * 1/2004 Sloat et al. ............ 428/195.1

(Continued)

FOREIGN PATENT DOCUMENTS

JP          6-135439        *  5/1994

(Continued)

*Primary Examiner*—Eric Hug
(74) *Attorney, Agent, or Firm*—Buchanan, Ingersoll & Rooney PC

(57) ABSTRACT

A method of manufacturing a light barrier paper packaging material and the light barrier paper package container with low cost, no need of an ink removing apparatus at reproduction step and easily recycle are provided. A light barrier paper packaging material which comprises the paper substrate and the laminate layers on the paper substrate comprises: the paper substrate having a clay coat layer applied to the paper substrate; a light barrier layer printed with black ink on the clay coat layer; cover-up layers printed with white color ink to the light barrier layer a plurality of times; an outside laminate layer of thermoplastic resin formed on the cover-up layer, and design printed to the outside laminate layer.

17 Claims, 1 Drawing Sheet

U.S. PATENT DOCUMENTS

2002/0114933 A1 * 8/2002 Gould .................... 428/212

FOREIGN PATENT DOCUMENTS

| JP | 2000-006295 | * | 1/2000 |
| JP | 2000-135768 | | 5/2000 |
| JP | 2000-281096 | | 10/2000 |
| JP | 2001-130629 | | 5/2001 |
| JP | 2001-164493 | | 6/2001 |

* cited by examiner separated clay coat layer

METHOD FOR MANUFACTURING LIGHT BARRIER PACKAGING MATERIAL, LIGHT BARRIER PACKAGING MATERIAL, SEMI PAPER PACKAGING MATERIAL AND LIGHT BARRIER PAPER PACKAGING CONTAINER

A method for manufacturing light barrier packaging material, light barrier packaging material, semi paper packaging material and light barrier paper package container

TECHNICAL FIELD

The present invention relates to a method of manufacturing a light barrier packaging material, a light barrier packaging material, a semi paper packaging material and a light barrier paper package container.

BACKGROUND ART

Beverages such as milk, juice and the like are provided with, for example, gable-top containers. Beverages packed by the container are exposed to sunlight and lighting of fluorescent lamp of a refrigeration showcase in distribution processes for long time.

As for a photosensory food such as low-fat cow's milk, certain of consumers recognize that some off-flavor is generated in the food of cow's milk by the effect of the light.

Therefore, the paper packaging material/the packing container/the cup which have a light barrier is drawn attention of, and various materials have been suggested and used.

The following proposals are mentioned: for example, a packaging material having a light barrier layer between a substrate and an innermost layer and a coloring printing layer on one side thereof (JP A 7-52328), a cup including a barrier film, a light barrier layer, a cover-up layer in a paper substrate (JP A 11-130044), a laminate having a paper substrate layer, a metal vapor deposition plastic interlayer and a metallocene polyethylene internal layer (JP A 09-86537), a packaging material provided with a light barrier layer comprising gel-like synthetic resin, light barrier agent and wax on at least one surface of a paper support (WO A 0175227), a paper-made liquid container with a paper layer, a transparent gas barrier layer, a coloring light barrier layer and a thermoplastic resin layer (JP A 06-238834), a paper laminated material with a cardboard substrate, a light barrier resin layer, a white resin layer and an innermost layer (JP A 09-24583), a packaging material comprising a paper layer, an outside polyolefin resin layer, a barrier layer, an inside polyolefin seal layer and a light barrier materials between any of their layers (JP A 06-135439).

However, the above-mentioned proposals mostly provide the light barrier layer in the inside of the paper substrate. When the food such as cow's milk being sensitive to chemical is filled up, from viewpoint of legal regulation and effect to taste, it is unfavorable to provide the light barrier layer in the food side.

In a method, a light barrier layer is printed with black ink to a paper substrate, and the effect of the black ink is shielded with a clay coat layer by a clay coater In the method, a packaging material having a layer structure comprising an outside laminate layer/a design printing layer/a clay court layer/a light barrier layer of black ink/a paper substrate/an inside laminate layer is obtained.

However, the method includes many total manufacturing steps with very high costs. Because the black ink is printed directly on the paper layer, the black ink penetrates through the paper fiber, and an ink removing apparatus is necessary for reproduction in the recycle.

In other packaging material with a layer structure comprising a printing layer of design/a white ink layer/a white ink layer/a white ink layer/a black ink layer/a laminate layer/a paper substrate/an outside laminate layer, a few colors white inks are used to shield the effect of the black ink after the extrusion laminate. However, most packaging materials for gable-top containers is purchased as the so-called poly-coat paper which is laminated, are converted in a packaging material factory. When three or four colors white inks are used in the converting steps, the remaining color number for the press becomes short, and the design is limited. In addition, as a result, the number of the laminated ink becomes six or seven colors, and the ink layers might be de-laminated.

DISCLOSURE OF INVENTION

A purpose of the present invention is to provide a light barrier paper packaging material and a light barrier paper package container that shield light and have a light barrier layer in itself not influencing foods certainly, when the foods such as cow's milk sensitive to light and chemicals are filled up.

The second purpose of the present invention is to provide a method of manufacturing a light barrier paper packaging material and a light barrier paper package container with easily recyclability, no penetration of black ink into the paper fiber and no necessity of an ink removing apparatus in the reproduction step, because of less steps of manufacturing packaging material, low manufacture cost and indirect print of black ink on the paper layer.

The third purpose of the present invention is to provide a method of manufacturing a light barrier paper packaging material in which the laminated semi packaging material is converted in the same way as conventional way in a converting factory because a plurality of white inks are printed to shield effect of black ink before extrusion lamentation, many colors for press in the converting step for container design are not limited, and delamination of the ink layers is prevented with less laminated layer of ink.

The above subject is achieved by a method of manufacturing a light barrier packaging material, a light barrier paper packaging material, a semi paper packaging material and a light barrier paper package container according to this invention.

A method of manufacturing a light barrier packaging material according to this invention comprising a paper substrate, and layers laminated on the outside and the inside of the paper substrate comprising the following steps:

a step of preparing the paper substrate of which, the outside surface or both side surfaces are applied with a clay coat layer, a step of printing a light barrier layer with black ink on the substantial whole surface of the clay coat layer or preferably at least surface to need light barrier, a step of printing cover-up layers with one kind or a plurality of kinds of inks to the light barrier layer a plurality of times, preferably at least three times, more preferably more than four times, concretely 4-6 times, a step of forming an outside laminate layer of thermoplastic resin on the cover-up layer, and a step of printing predetermined design to the outside laminate layer.

With the invention having the above subject matters, the following functions and advantageous effect are shown as follows:

The invention provides the light barrier paper packaging material and the light barrier paper package container that shield light and have the light barrier layer in itself not influencing foods certainly, when the foods such as cow's milk sensitive to light and chemicals are filled up. In a reproduction step of the paper container recycling, the clay coat layer exfoliates from paper easily, and the black ink portion can be divided from paper fiber. Even conventional packaging material factory using semi packaging material can carry out the converting as same as the conventional converting, Color number of a press (printing machine) in converting step can be used for container design without further limitation.

In preferable embodiment of the method of manufacturing the light barrier packaging material of this invention, the light barrier layer and the cover-up layer are printed continually, and the ink for printing the cover-up layer is white ink.

With the above preferable embodiment of this invention, the black of the light barrier layer is covered with white of the cover-up layer, and the printing design of the container outward appearance can be designed easily.

The light barrier paper packaging material according to this invention which comprises the paper substrate and the laminate layers laminated on the outside and the inside of the paper substrate is characterized in that the light barrier paper packaging material comprises a paper substrate having a clay coat layer applied to at least outside surface of the paper substrate, a light barrier layer printed with black ink on the substantial whole surface of the clay coat layer or preferably at least surface to need light barrier, cover-up layers printed with one kind or a plurality of kinds of inks to the light barrier layer a plurality of times, an outside laminate layer of thermoplastic resin formed on the cover-up layer, and a given design printed to the outside laminate layer.

The above preferable embodiment of this invention enables to shield light effectively to protect food contents sensitive to light, to prevent food contact of chemical constituents included by the light barrier layer, and to regenerate paper fiber effectively and easily in recycle of the container.

The light barrier packing container according to this invention formed with the light barrier paper packaging material comprising the paper substrate, and layers laminated on the outside and the inside of the paper substrate is characterized in that the light barrier paper packaging material comprising a paper substrate having a clay coat layer applied to at least outside surface of the paper substrate, a light barrier layer printed with black ink on at least the surface to need light barrier of the clay coat layer, cover-up layers printed with one kind or a plurality of kinds of inks to the light barrier layer a plurality of times, an outside laminate layer of thermoplastic resin formed on the cover-up layer, and a design printed to the outside laminate layer.

The above structure according to the invention enables to shield light effectively to protect food contents sensitive to light, to prevent food contact of chemicals of the light barrier layer by providing the light barrier layer in the outside of the container wall, and to regenerate paper fiber effectively and easily in recycle of the container.

The method of manufacturing a light barrier packaging material according to another embodiment of this invention comprising a paper substrate, and layers laminated on the outside and the inside of the paper substrate comprises following steps:

a step of preparing a semi-packaging material having a paper substrate having a clay coat layer applied to at least outside surface of the paper substrate, a light barrier layer printed with black ink on at least surface to need light barrier for the surface of the clay coat layer, cover-up layers printed with one kind or a plurality of kinds of inks to the light barrier layer a plurality of times, and an outside laminate layer of thermoplastic resin formed on the cover-up layer; and a step of printing a predetermined design to the outside laminate layer.

This invention enables to manufacture the light barrier paper packaging material by preparing the semi packaging material according to this invention and using the conventional facilities at the conventional packaging material converting factory where a semi packaging material roll is purchased and is finally converted for design printing and the like.

In the method of manufacturing light barrier packaging material of the above embodiment according to this invention, the cover-up layers are formed by repeating the printing at least three times, preferably more than four times.

With the structure according to the invention, the thick cover-up layer is not printed once, but the cover-up layers are printed at least three times, preferably more than four times to realize good layer strength between cover-up layers and thickness having the cover-up effect of the cover-up layer. By many times repetition overturning conventional recognition, the cover-up layers are obtained easily.

In the light barrier packaging material of the above-mentioned embodiment according to this invention, the ink of the cover-up layer contains titania (titanium oxide) having ultraviolet absorption characteristics.

The above-mentioned embodiment enable to shield ultraviolet light from the outside in the cover-up layer, and to cover the inside black color.

The light barrier semi packaging material according to this invention is characterized in that the packaging material comprises a paper substrate having a clay coat layer applied to at least outside surface of the paper substrate, a light barrier layer printed with black ink on at least the surface to need light barrier of the clay coat layer, cover-up layers printed with one kind or a plurality of kinds of inks to the light barrier layer a plurality of times, an outside laminate layer of thermoplastic resin formed on the cover-up layer, and the packaging material has web-shape and is wound up as a reel.

The light barrier semi packaging material according to the above-mentioned embodiment enable to prevent pollution of chemical substance to an innermost layer where liquid food to be packed contacts the container directly even when the packaging material is wound up roll because the ink chemical substance of the light barrier layer and the cover-up layer is covered by the outside laminate layer. In addition, because of the roll-shape, it is convenient for handling.

The light barrier packing container according to the preferable embodiment of this invention is characterized by having the cover-up layer formed by 3-6 times, preferably 4-6 times repetition of the printing. In case of more than the upper limit, chemical smell of the ink might be generated. In case of less than the lower limit, it becomes difficult to cover up the black color.

With the structure according to the invention, the thick cover-up layer is not printed once, but the cover-up layers are printed 4-6 times, by many times repetition overturning conventional recognition, to realize good layer strength between cover-up layers and enough thickness having the cover-up effect of the cover-up layer.

The light barrier packaging material according to the preferable embodiment of this invention is characterized in that the outside laminate layer of thermoplastic resin formed on the surface of the cover-up layer is the extruded laminate layer containing white pigment.

Because the outside laminate layer contains white pigment, the outside laminate layer takes one part of functions of the cover-up layer, and the layer number of the cover-up layer and the layer thickness can be reduced.

The method of manufacturing the light barrier packaging material according to the preferable embodiment of this invention is characterized in that ink printing the light barrier layer and the cover-up layer is low-solvent-containing ink.

The paper packaging material showing low smell can be manufactured by using the ink with a little content of organic solvent or the ink including no solvent.

A method of manufacturing a light barrier semi packaging material according to this invention comprising a paper substrate, and layers laminated on the outside and the inside of the paper substrate comprises the following steps:

a step of preparing the paper substrate having a clay coat layer applied on at least the outside surface of the paper substrate, a step of printing a light barrier layer with black ink on at least the surface to need light barrier of the clay coat layer, a step of printing cover-up layers with one kind or a plurality of kinds of inks a plurality of times to the light barrier layer and in a neighborhood of the edge of the light barrier layer, and a step of forming an outside laminate layer of thermoplastic resin on the cover-up layer.

With the above preferable embodiment of this invention, further advantageous effect is shown as follows:

It is not necessary to print with black ink to the surface to not need the light barrier layer. Because light barrier side does not do badly influence the outward appearance design, and the neighborhood of the light barrier edge is printed with the cover-up layer, the black color does not appear to the outside design even if the black color printing slips off from the printing design.

BEST MODE TO CARRY OUT INVENTION

Figure 1A:
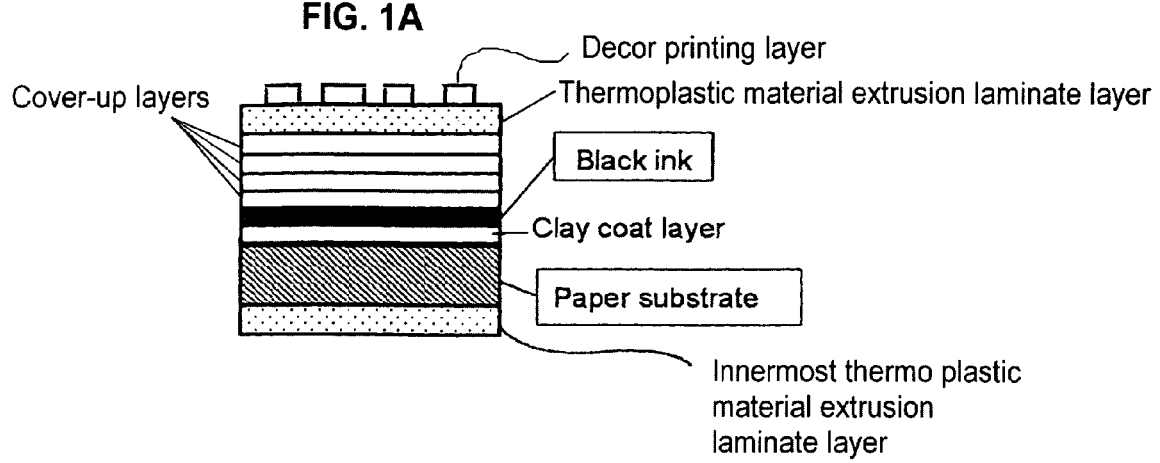
FIG. 1A is an illustration of a light barrier paper packaging material.
Figure 1B:
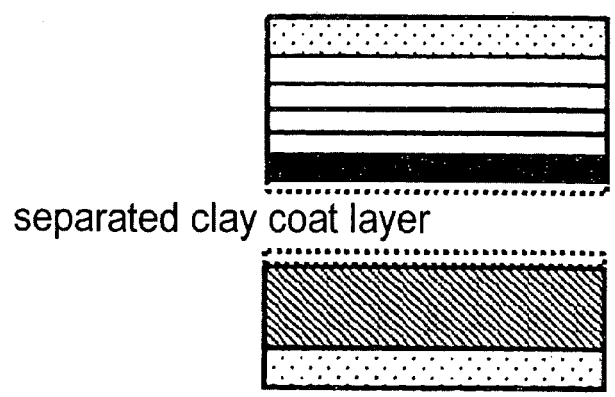
FIG. 1B is an illustration of the light barrier paper packaging material during a recycling process.

Embodiments of the present invention are explained in detail as follows.

The layer structure examples of the light barrier packaging material of the embodiments includes (1) decor printing layer/thermoplastic material extrusion laminate layer/white ink layer/white ink layer/white ink layer/black ink layer/clay coat layer/paper substrate/innermost thermoplastic material extrusion laminate layer, (2) decor printing layer/thermoplastic material extrusion laminate layer/white ink layer/white ink layer/white ink layer/white ink layer/white ink layer/white ink layer/black ink layer/clay coat layer/paper substrate/innermost thermoplastic material extrusion laminate layer, and (3) decor printing layer/thermoplastic material extrusion laminate layer/white ink layer/white ink layer/white ink layer/white ink layer/white ink layer/black ink layer/clay coat layer/paper substrate/innermost thermoplastic material extrusion laminate layer.

The packaging material according to this invention may not use the oxygen barrier layers such as metal layer (ex. aluminum foil), a vapor deposit layer of inorganic oxide and metal, but can shows the light barrier without the oxygen barrier layers. In the case of necessary oxygen barrier and optical transparent oxygen barrier layer, light barrier packaging material according to this invention is useful.

The ink of the light barrier layer and the ink of the cover-up layer are printed by gravure printing method, offset printing method, flexography method. The layer thickness of the ink is chosen and changed appropriately. The ink of the light barrier layer and the ink of the cover-up layer, according to the purpose, is chosen. For example, the ink of the light barrier layer includes black ink, dark color system ink, metallic luster ink and the like. The ink of the cover-up layer includes white ink, being light-colored ink, gray ink and the like.

Printing times of the ink of the light barrier layer and the ink of the cover-up layer are chosen and changed appropriately. For example, the ink of light barrier layer is printed once, and the printing of the ink of the cover-up layer is repeated a plurality of times, for example 2-8 times, preferably 4-6 times or 5-6 times.

Besides the layers of the above layer structure, it is possible to laminate the above-mentioned oxygen barrier layer, a lacquer coat layer, adhesive resin layer and the like, if necessary. In addition, on the occasion of laminating, possible surface treatments include flame treatment, plasma treatment, corona treatment and the like.

The method of manufacturing a light barrier packaging material according to one embodiment of this invention manufactures the packaging material comprising a paper substrate, and layers laminated on the outside and the inside of the paper substrate.

One example of this embodiment is shown the following.

First of all, a paper substrate (clay coat paper) with a clay coat layer coated on the outside surface of the paper substrate is prepared. In case of a packaging material for example a gable-top container, roll-shaped clay coat paper having about 1.18 m-1.48 m width is prepared.

In a paper converting factory, a light barrier layer is printed in photogravure method on substantially entire surface with black color ink on the clay coat layer surface.

Cover-up layers are printed three or four times in gravure printing with white ink covering the light barrier layer surface on the light barrier layer surface continuously.

An outside laminate layer is formed by extrusion with low density polyethylene on the cover-up layer surface. The wide web-shaped packaging material is silted to roll-shaped packaging materials of, for example, 59 cm-89 cm width.

Finally, the predetermined design is printed by offset duplicator or flexography machine on the outside laminated layer surface, and the packaging material is cut into the predetermined shape size, and is sealed longitudinally.

The obtained blanks for gable-top paper containers are delivered to food factory where liquid food is filled and packed, and are formed to the following light barrier package container according to the present invention.

The container is formed from the paper packaging material comprising a paper substrate having a clay coat layer applied to outside surface of the paper substrate, a light barrier layer printed with black ink on substantially whole surface of the clay coat layer, cover-up layers printed with white ink to the light barrier layer a plurality of times, an outside laminate layer of thermoplastic resin formed on the cover-up layer, and a predetermined design printed to the outside laminate layer.

Another example of the embodiment according to this invention is shown as follow.

A web-shaped roll of paper substrate (clay coat paper) having 90 cm width with a clay coat layer coated on the outside surface of the paper substrate is prepared. In a paper converting factory, the paper substrate is wound up from the roll, and is converted into the packaging material having 88.8 cm width by cutting both edges with a slitter.

Three lines with 26.5 cm width of the light barrier layer are printed with gravure printing with black color ink on the clay coat layer surface at intervals of 2.74 cm.

Three lines with 26.7 cm width of the cover-up layers are printed six times in gravure printing with white ink covering the light barrier layer surface on the surfaces of three lines with 26.5 cm width of the light barrier layer continuously.

The cover-up layers cover further printing gaps since the width of this cover-up layer is wider than the width of the light barrier layer surface.

Outside laminate layer is formed on the cover-up layer surface by extrusion of low density polyethylene. The obtained wide web-shaped packaging material is slit into three roll-shaped packaging materials having about 28 cm width except both edges where no ink of the cover-up layer and the light barrier layer is printed.

The slit packaging materials are wound up as a roll-shaped semi packaging material, and are delivered to a printing factory or a warehouse if necessary.

Finally, the predetermined design is printed by offset printer or flexography machine on the outside laminated layer surface, and the packaging material is cut into the predetermined shape size, and is sealed longitudinally.

The obtained blanks for gable-top paper containers are delivered to food factory where liquid food is filled and packed, and are formed to the following light barrier package container according to the present invention.

Further another example of the embodiment according to this invention is shown as follow.

This embodiment is different from the above-mentioned embodiment in the point which white masterbatch is added in rate of 10%-20% in the low density polyethylene extruded to the cover-up layer surface and the point that gravure printing times of the cover-up layer with white ink are reduced to 5-4 times.

The obtained blanks for gable-top paper containers are delivered to food factory where liquid food is filled and packed, and are formed to the light barrier package container according to the present invention. The light barrier packing container has light barrier performance same as ones of the above-mentioned embodiments, and the cover-up surface of many times printing is protected with cloudiness color.

As shown in the above embodiments, the following advantageous effect of the material, the container and the method according to the present invention are shown.

(1) In the light barrier paper packaging material and the light barrier paper package container, the light barrier layer in itself does not influence foods certainly, when the foods such as cow's milk sensitive to light and chemicals are filled up.

(2) In the method of manufacturing a light barrier paper packaging material and a light barrier paper package container, they keep easily recyclability, no penetration of black ink into the paper fiber and no necessity of an ink removing apparatus in the reproduction step, because of less steps of manufacturing packaging material, low manufacture cost and indirect print of black ink on the paper layer.

(3) In the method of manufacturing a light barrier paper packaging material, the packaging material is converted in the same way as conventional way in a converting factory because white inks are printed 3-4 times to shield effect of black ink before extrusion lamination, many colors for press in the converting step for container design are not limited, and delamination of the ink layers can be prevented with less laminated layer of ink.

INDUSTRIAL APPLICABILITY

The light barrier packaging material, the semi packaging material and the light barrier paper package container according to this invention are used for a package container filling with liquid food such as cow's milk, soft drinks.

The invention claimed is:

1. A method of manufacturing a light barrier packaging material comprising:
   preparing a paper substrate possessing an outside surface to which is applied a clay coat layer, the clay coat layer possessing an outside surface,
   printing a light barrier layer of black ink on the outside surface of the day coat layer,
   printing cover-up layers onto the light barrier layer a plurality of times, the cover-up layers being printed using one kind of ink or a plurality of kinds of ink,
   forming an outside laminate layer of thermoplastic resin on one of the cover-up layers, and
   printing a predetermined design to the outside laminate layer.

2. A method of manufacturing a light barrier packaging material as defined in claim 1, wherein the light barrier layer and the cover-up layers are printed continually, and the ink used to print the cover-up layers is white ink.

3. A method of manufacturing a light barrier packaging material as defined in claim 1, wherein the cover-up layers are formed by at least 4 times repetition of the printing.

4. A method of manufacturing the light barrier packaging material as defined in claim 1, wherein the ink used in the light barrier layer and the cover-up layers is low-solvent-containing ink.

5. A light barrier paper packaging material which comprises a paper substrate possessing an outside and an inside, an inside laminate layer laminated on the inside of the paper substrate, a clay coat layer applied to at least an outside surface of the paper substrate, the clay coat layer having an outside surface, a light barrier layer of black ink printed on an outside surface of the clay coat layer, a plurality of cover-up layers printed on the light barrier layer, the cover-up layers being printed using one kind of ink or a plurality of kinds of ink, an outside laminate layer of thermoplastic resin formed on one of the cover-up layers, and a predetermined design printed to the outside laminate layer.

6. A light barrier packaging material as defined in claim 5, wherein the outside laminate layer of thermoplastic resin is formed on an surface of an outermost one of the cover-up layers, and the outside laminate layer of thermoplastic resin is an extruded laminate layer containing white pigment.

7. A light barrier paper packaging material as defined in claim 5, wherein the plurality of cover-up layers comprises at least 4 cover-up layers.

8. A light barrier packing container formed with a light barrier paper packaging material comprising a paper substrate possessing an outside and an inside, an inside laminated layer on the inside of the paper substrate, a clay coat layer applied to at least an outside surface of the paper substrate, the clay coat layer having an outside surface, a light barrier layer of black ink printed on the outside surface of the clay coat layer, a plurality of cover-up layers printed on the light barrier layer, the cover-up layers being printed using one kind of ink or a plurality of kinds of ink, an outside laminate layer of thermoplastic resin formed on one of the cover-up layers, and a predetermined design printed to the outside laminate layer.

9. A light barrier packaging material as defined in claim 8, wherein the ink of the cover-up layers contain titania having ultraviolet absorption characteristics.

10. A light barrier packaging container as defined in claim 8, wherein the cover-up layers are formed by at least 4 times repetition of the printing.

11. A light barrier packing container as defined in claim 8, wherein the plurality of cover-up layers comprises at least 4 cover-up layers.

12. A method of manufacturing a light barrier packaging material comprising:
    preparing a semi-packaging material comprising a paper substrate having an inside and an outside, an inside laminate layer laminated on the inside of the paper substrate, a clay coat layer applied to at least an outside surface of the paper substrate, a tight barrier layer of black ink printed on an outside surface of the clay coat layer, a plurality of cover-up layers printed on the light barrier layer, the cover-up layers being printed with one kind of ink or a plurality of kinds of ink, and an outside laminate layer of thermoplastic resin formed on the cover-up layers, and
    printing a predetermined design on the outside laminate layer.

13. A method as defined in claim 12, wherein the plurality of cover-up layers of the semi-packaging material comprises at least 4 cover-up layers.

14. A web-shaped light barrier semi packaging material wound up as a reel, wherein
    the packaging material comprises a paper substrate having a clay coat layer applied to at least an outside surface of the paper substrate, a light barrier layer of black ink printed on an outside surface of the clay coat layer, a plurality of cover-up layers printed on the light barrier layer, the cover-up layers being printed with one kind of ink or a plurality of kinds of ink, and an outside laminate layer of thermoplastic resin formed on the cover-up layers.

15. A web-shaped light barrier semi packaging material wound up as a reel as defined in claim 14, wherein the plurality of cover-up layers of the packaging material comprises at least 4 cover-up layers.

16. A method of manufacturing a light barrier semi packaging material comprising:
    preparing the paper substrate having a clay coat layer applied on at least an outside surface of the paper substrate,
    printing a light barrier layer of black ink on an outside surface of the day coat layer,
    printing cover-up layers a plurality of times to the light barrier layer and in a neighborhood of an edge of the light barrier layer, the cover-up layers being printed with one kind of ink or a plurality of kinds of ink; and
    forming an outside laminate layer of thermoplastic resin on one of the cover-up layers.

17. A method as defined in claim 16, wherein the printing of the cover-up layers a plurality of times comprises printing the cover-up layer at least four times.

* * * * *